United States Patent [19]

Kitajima

[11] 3,712,460

[45] Jan. 23, 1973

[54] MECHANISM FOR AUTOMATICALLY TRANSPORTING FILTER PLATES IN FILTER PRESS

[75] Inventor: Susumu Kitajima, Higashi-Osaka, Japan

[73] Assignee: Kurita Machinery Manufacturing Company, Limited, Nishiku, Osaka, Japan

[22] Filed: Dec. 16, 1970

[21] Appl. No.: 98,758

[30] Foreign Application Priority Data

Feb. 7, 1970 Japan..........................45/10886
Nov. 28, 1970 Japan..........................45/105098

[52] U.S. Cl................................................198/221
[51] Int. Cl................................................B65g 25/08
[58] Field of Search......................198/221, 222, 224

[56] References Cited

UNITED STATES PATENTS

1,838,780  12/1931  Miller et al. ...............198/221 UX
2,554,935  5/1951   Boucher...........................198/168

Primary Examiner—Evon C. Blunk
Assistant Examiner—Douglas D. Watts
Attorney—Donal E. McCarthy, George A. Depaoli, William E. O'Brien and Robert L. Price

[57] ABSTRACT

A transport assembly is mounted on a drive belt for reciprocal movement. When travelling in one direction, the transport assembly transports filter plates toward a movable end plate one after another. The transport assembly includes a drive dog for moving the filter plates in contact therewith and a stop dog for switching the running direction of the drive belt from a counter-transport direction to a transport direction upon contact with the filter plate. The drive dog is usually retained in an upright position while the stop dog is held in an inclined position. The drive dog, when inclined, brings the stop dog to the upright position so that the transport assembly can be moved back and forth for transport of the plates without being interfered with by the plates pressed together for filtration or by a plate which has already been transported.

11 Claims, 19 Drawing Figures

Inventor
SUSUMU KITAJIMA

MECHANISM FOR AUTOMATICALLY TRANSPORTING FILTER PLATES IN FILTER PRESS

BACKGROUND OF THE INVENTION

Various means for transporting filter plates in a filter press have heretofore been known but all of the conventional mechanisms are of a complex construction. For instance, in a mechanism wherein a plurality of transport means are mounted on a drive belt such as a chain, the transport means have to be adjusted relative to each other. Such mechanism is not only troublesome to operate but becomes also more costly in proportion to the number of the transport means provided therein. With a structure wherein transport means is adapted to be moved down and released from the handle of a filter plate due to a great resistance produced when the transport means has completely transported the plate to a terminal position, there is a need to mount a disengageable member for providing the transport means with a pressure necessary for the transportation of the filter plate. Since a great friction will be produced between the transport means and the handle of the plate when the former gets released from the latter, such structure has a drawback that the friction thus produced wears the under face of the handle.

SUMMARY OF THE INVENTION

The present invention relates to a mechanism for transporting filter plates in a filter press, more particularly to a mechanism for automatically transporting filter plates in a filter press wherein a plate transport assembly is driven back and forth to transport the filter plates one after another when it is moved in one direction.

An object of this invention is to provide a plate transport mechanism wherein only one transport assembly adapted for reciprocal movement is mounted on one drive belt so as to enable a plurality of filter plates to be transported one after another and wherein there is no need to provide any special additional means for enabling the transport assembly to pass under the handle of the plate when it has completely transported the plate, the mechanism thus being free from wear on the under face of the handle which would otherwise be produced due to the friction between the transport assembly and the handle.

Another object of this invention is to provide a plate transport mechanism of the simplest possible construction wherein switching of the running direction of the transport assembly for reciprocation is effected by simple additional means mounted on the transport assembly. The transport assembly mounted on a drive belt therefore comprises a drive dog for transporting filter plates adapted to provide a direction switching signal for the drive belt upon contact of a transported plate with a preceding plate, and a stop dog adapted to provide a direction switching signal for the drive belt upon contact with the rear face of the next filter plate when the drive dog is brought to the front of handle of the filter plate during travel in the counter-transport direction.

The transport assembly of this invention principally comprises a drive dog and a stop dog which are pivotally mounted on a drive frame secured to a drive belt. The drive dog is adapted to be limited in its pivotal movement as it is moved from an upright position in a counter-transport direction, while the pivotal movement of the stop dog from an upright position toward a transport direction is also limited, such limitation being affected by stoppers mounted on the drive frame.

The drive dog and the stop dog are actuated in operative relation to each other; when one dog is inclined, the other is forced or automatically allowed to stand up. Such interlocking relation between the two members is achieved in various modes of embodiment.

In accordance with the present invention, when the transport assembly is driven in the counter-transport direction on the drive belt for the transportation of the plates which are pressed together, the drive dog on the drive frame comes into contact with the rear face of handle of the rearmost filter plate, whereupon the drive dog is inclined due to contact with the handle and allowed to pass under the handle. On the other hand, in synchronization with the inclination of the drive dog, the stop dog begins to stand up, thus making it sure that the stop dog will come into contact with the handle even if the drive dog is allowed to stand up upon passing under the handle. Simultaneously when or after the drive dog has been released from the handle to stand up, the stop dog abuts against the handle and is thereby brought to an upright position until it is blocked by the stopper. The contact of the stop dog in upright position with the handle now provides a running direction switching signal for the drive belt, and when the direction is reversed, the drive frame moves in the transport direction causing the drive dog, already in upright position, to contact the handle of the rearmost filter plate for transport operation. When the drive dog thus comes into contact with the handle, the stop dog is inclined because it is so urged.

To change the running direction of the transport assembly for reciprocation, a reversible motor, for instance, may be used. The contact of the stop dog with the group of plates and the contact of one plate with the movable end plate or with the preceding plate already transported turns off a switch on a control panel to stop the motor and the motor may then be initiated into rotation in the reverse direction by means of a timer or a change-over switch. By repeating such operation, reciprocal travel can be carried out automatically and continuously.

DESCRIPTION OF THE PREFERRED EMBODIMENTS

Figure 1:
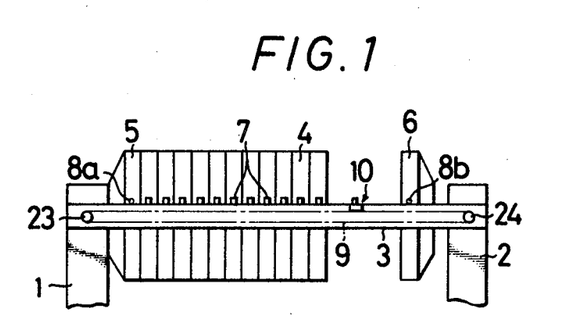
FIG. 1 is a side elevation showing a filter press provided with a plate transport mechanism embodying the present invention in the most primary mode.

Referring to an embodiment shown in FIGS. 1 to 4, the main body of a filter press generally comprises frames 1 and 2 disposed on the opposite ends, side bars 3 and 3 extending between the frames 1 and 2 and fixed thereto, a number of filter plates 4 supported on the side bars 3 and 3, a stationary end plate 5 and a movable end plate 6 positioned respectively at the front and rear of a group of the filter plates. Each of the filter plates 4 is provided with handles 7 and 7 projecting from its opposite sides. The filter plates 4 are movably supported on the side bars 3 and 3 with the handles 7 positioned thereon. The movable end plate 6 also has handles 8a and 8b on the opposite sides by which the plate 6 is movably supported on the side bars 3 and 3. The stationary end plate 5 is secured to the front frame 1. For filtering operation, the movable end plate 6 is advanced by means of an unillustrated cylinder or the like. The movable end plate 6, when advanced, presses the filter plates 4 against the stationary end plate 5 as seen in FIG. 1. In this position, a prefilt is fed to the filter press. The liquid supplied is filtered while being passed through filter mediums (not shown) interposed between the filter plates 4 and a filtrate obtained is discharged from the filter press. On the other hand, cake separated by filtration is deposited between filter plates 4, so that when filtration is completed, the filter plates 4 are released one after another to allow the cake to drop off the filter plates 4 for removal.

A filter plate transport mechanism comprises a drive belt 9 such as a chain disposed outside the side bar 3 and a transport assembly 10 fixed to the drive belt 9. The filter plates 4 in pressing contact with each other for filtration are moved one by one toward the movable end plate 6 by the transport assembly. When transported one after another, the filter plates 4 are released from each other to allow the cake deposited between the plates 4 to drop spontaneously.

The transport assembly 10 is shown in detail in FIGS. 2 to 7. Referring to these drawings, a drive frame 11 is fixed to the drive belt 9. A drive dog 12 is mounted on the drive frame 11 by a pivot 13 and urged toward a counter-transport direction by a spring 14. A stopper 15 fixed to the frame 11 serves to retain the drive dog 12 in an upright position and prevents the dog from moving further toward a counter-transport direction. A stop dog 16 pivotally mounted on the drive frame 11 by a pivot 17 is loaded with a spring 18 which urges the dog 16 in the counter-transport direction. A stopper 19, also fixed to the drive frame 11, serves to prevent the stop dog 16 from pivotally moving toward a transport direction beyond an upright position. By the transport direction as herein used is meant a direction in which the filter plates 4 are transported toward the movable plate 6 for separation. This direction is indicated by an arrow a in FIG. 2. The drive dog 12 and the stopper dog 16 are provided with such length and path for movement that they come into contact with the handle 7 of each plate 4 when brought to the upright position. The path of movement is determined by the provision of the drive belt 9. An idle member 20 positioned between the drive dog 12 and the stop dog 16 is integrally formed with the free end of a pivotal arm 22 which is mounted on a pivot 21 fixed to the drive frame 11. Alternatively, the idle member 20 may be provided as a roller member at the free end of the arm 22. As will be described later, the idle member 20 is pushed by the drive dog 12 when it is brought to an inclined position, the arrangement being such that the idle member 20, when thus moved by pushing, brings the stop dog 16 to the upright position.

The drive belt 9 comprises a chain trained around two sprockets 23 and 24. One sprocket 23, for example, is driven by an unillustrated motor.

The drive frame 11 and all of the members mounted thereon constitute the transport assembly 10.

Indicated at 25 in the drawings is a guide rail, C-shaped in section, for disposing the drive belt 9 therein. The drive belt 9 includes rollers 26 in rolling contact with the bottom face 25a of the guide rail 25. Guide rollers 27 are disposed on the opposite sides in the front and rear of the drive frame 11 and are in rolling contact with the opposite end portion of the guide rail 25 so as to stabilize the frame 11.

When the transport assembly 10 is so positioned as shown in FIG. 1 with the drive dog 12 and stop dog 16 free from contact with any of the handles 7 of the filter plates 4, the drive dog 12 and stop dog 16 are subjected only to the action of the springs 14 and 18. Accordingly, the drive dog 12 is held in upright position, while the stop dog 16 remains inclined toward the counter-transport direction. Since the stop dog 16, when brought to the inclined position under the action of the spring 18, pushes the idle member 20 in the counter-transport direction, the idle member 20, when brought into contact with the upstanding drive dog 12, defines the inclined position of the stop dog 16. This position is shown in FIG. 5.

When filtration has been completed, the transport assembly 10 in free position as already described is moved, by means of the drive belt 9, in a direction opposite to that indicated by the arrow *a* which belt is driven in the counter-transport direction. Thus the transport assembly 10 is sent forward to separate and transport the filter plates 4 which are in fitting engagement with each other for filtration.

Figure 2:
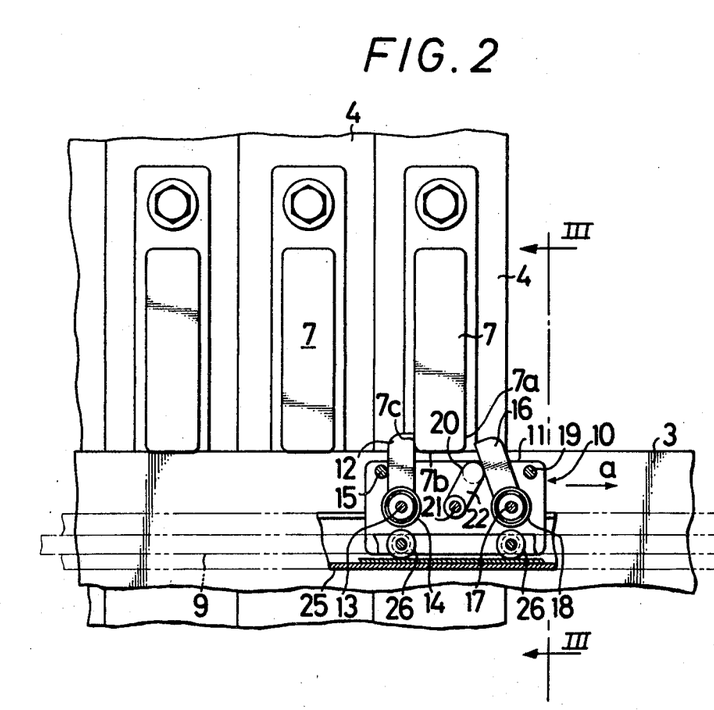
FIG. 2 is a side elevation of a principal part of FIG. 1 on an enlarged scale showing a transport assembly mounted on a drive belt, particularly the relationship of the handle of a filter plate with a drive dog and a stop dog mounted on the transport assembly, one side of the guide rail being cut away.
Figure 3:
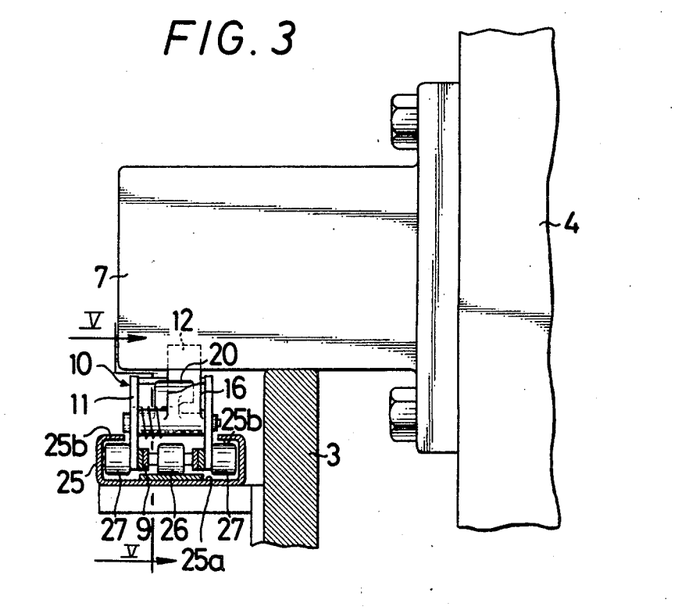
FIG. 3 is a sectional view taken along the line III—III in FIG. 2.
Figure 4:
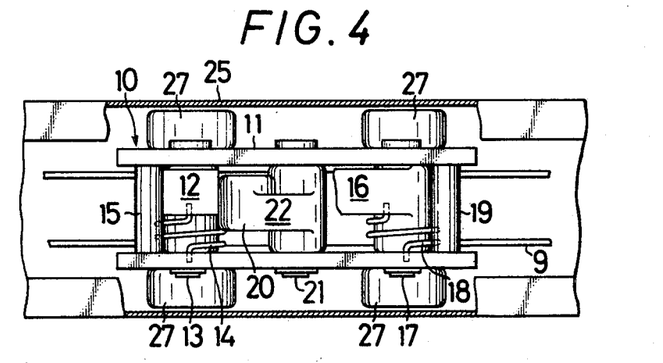
FIG. 4 is an enlarged plan view showing the transport assembly.
Figure 5:
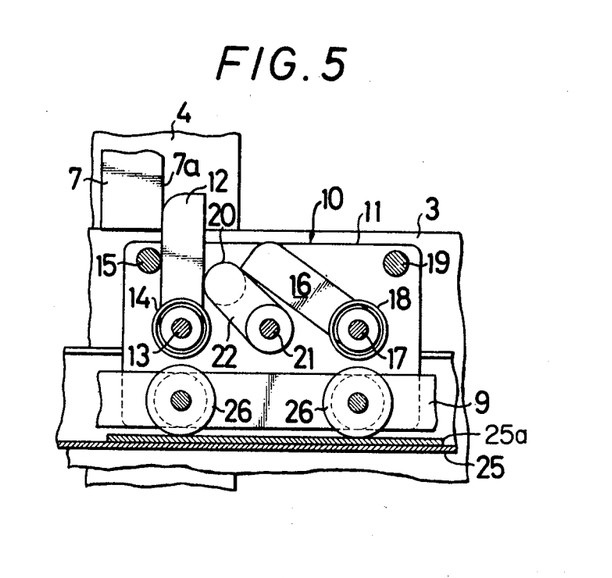
FIGS. 5 to 7 are enlarged views in section taken along the line V—V in FIG. 3 showing the operation of the drive dog and the stop dog.
Figure 6:
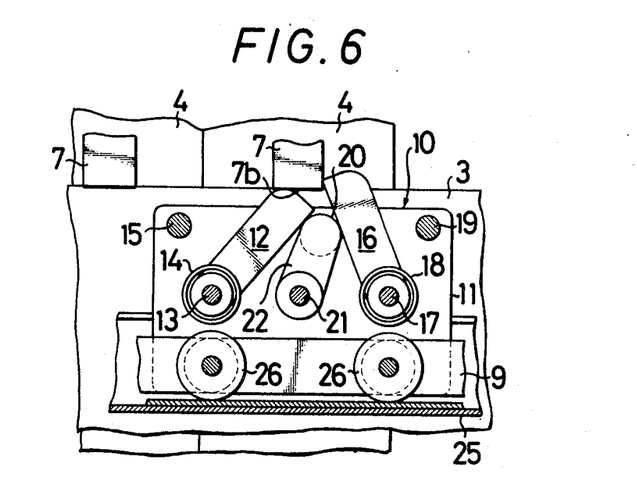
Figure 7:
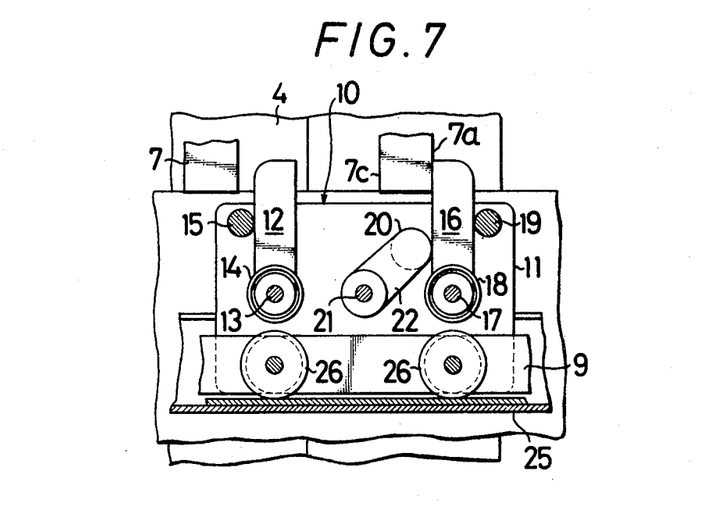

As the transport assembly 10 is further moved in the counter-transport direction, the drive dog 12 is brought into contact with the rear face 7*a* of handle 7 of the rearmost filter plate 4 as seen in FIG. 5. Due to further movement of the transport assembly 10 in the counter-transport direction, the drive dog 12 is inclined by the handle 7 against the action of spring 14 and finally passes along the lower face 7*b* of the handle 7. The drive dog 12 thus inclined pushes the idle member 20, which in turn raises the stop dog 16 against the action of spring 18 as shown in FIG. 6. When the transport assembly 10 is further advanced in the counter-transport direction, the drive dog 12 is freed from engagement with the under face 7*b* of handle 7 of the filter plate 4, whereupon the drive dog 12 is caused to stand up by the spring 14 acting thereon. On the other hand, although the stop dog 16 may not be completely brought to an upright position by the raising action caused by the above described inclination of the drive dog 12, the stop dog 16 is allowed to stand up until it is blocked by the stopper 19, since the upper end of the stop dog 16 is in contact with the rear face 7*a* of the handle 7. When the pivotal movement of the stop dog 16 in the transport direction is prevented by the stopper 19, with the dog 16 in contact with the handle 7, the drive belt 9 is prevented from further movement in the counter-transport direction due to the contact of the stop dog 16 with the handle 7. In response to the stoppage of the drive belt 9 effected by the stop dog 16, the running direction of the drive belt 9 is changed. Accordingly, the drive frame 11, so positioned as shown in FIG. 7, is initiated into movement in the transport direction as indicated by the arrow *a*, with the result that the drive dog 12 is brought into contact with the front face 7*c* of handle 7 on the rearmost filter plate 4 as seen in FIG. 2 so as to move the filter plate 4 in the direction of arrow *a* in pushing contact therewith. Thus, the plate 4 is transported toward the movable end plate 6 by the drive dog 12. When the drive dog 12 contacts the front face 7*c* of the handle 7 by virtue of the movement of the drive frame 11 in the transport direction, the stop dog 16 is released from the rear face 7*a* of the handle 7 and allowed to move pivotally in the counter-clockwise direction. The stop dog 16 is therefore brought to an inclined position under the action of the spring 18 as illustrated in FIG. 2. When the transport assembly 10 has finally brought the plate 4 into pressing contact with the movable end plate 6, further movement will be prevented and, consequently, the transport assembly 10 will also be brought to a halt. As a result, the drive belt 9 is stopped, whereupon the running direction of the drive belt 9 is switched from the transport direction to the counter-transport direction. The transport assembly 10 will now be moved in the counter-transport direction. Although the stop dog 16 at this time is positioned between the handle of the plate 4 thus transported and the movable end plate 6, the stop dog 16, being in inclined position as already described, will not interfere with the handle 7 but pass thereunder. In this way, the transport assembly 10 will be moved, in the position as illustrated in FIG. 5, in the counter-transport direction for the transport of the next plate without retracting the filter plate 4 that has been transported. By repeatedly carrying out the operation described above, the transport assembly 10 frees the filter plates 4 from pressing contact with each other and sends them toward the movable end plate 6 one after another. Every time one plate 4 is separated from another, the cake deposited therebetween is allowed to drop spontaneously.

To switch the running direction of the transport assembly 10 for reciprocal movement, a reversible motor, for example, may be used. Upon contact of the stop dog 16 with the handle 7 on the plate 4 as seen in FIG. 7, or upon contact of one plate 4 in transit with the movable end plate 6 or with the preceding plate 4 already transported, a switch on an unillustrated control panel may be turned off to stop the motor and the motor will then be initiated into rotation in the reverse direction by means of a timer or a change-over switch. By repeating such operation, reciprocation can be carried out automatically. Irrespective of whether or not the handles 8*a* and 8*b* of the stationary end plate 5 and movable end plate 6 are positioned at the level of the drive dog 12 and stop dog 16 in upright position but insofar as the handles are of such size that they are free of contact therewith, the transport assembly 10 with has completed transport of all of the plates 4 are further driven in the transport direction to a position in rear of the movable end plate 6.

Figure 8:
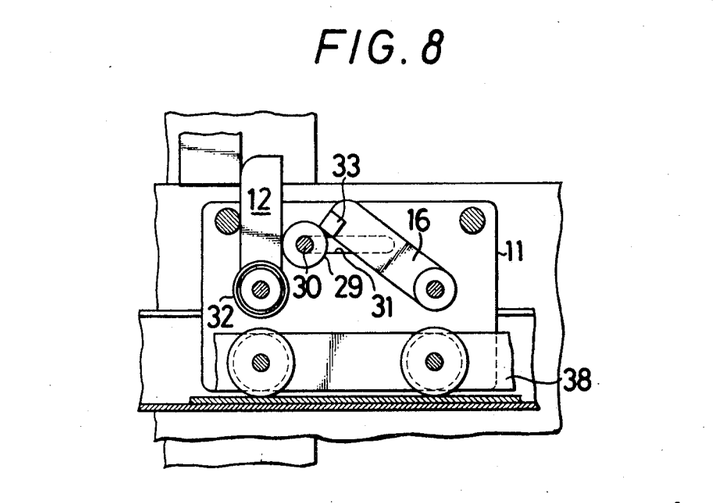
FIG. 8 is a side elevation in vertical section showing another mode of interlocking relation between the drive dog and the stop dog.
Figure 9:
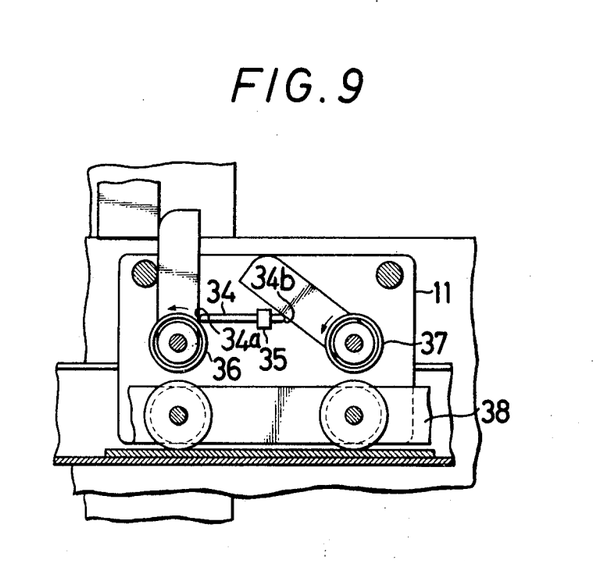
FIG. 9 is a side elevation in vertical section showing another mode of interlocking relation between the drive dog and the stop dog.

In the embodiments shown in FIGS. 8 and 9, the drive dog and stop dog mounted on the transport assembly are operatively related in a manner different from that in the foregoing embodiment, namely, by an idle member which is adapted for horizontal sliding movement. The members other than the idle member are similar to those used in the foregoing embodiment, so that in the description below common members are referred to with the same numerals.

The embodiment shown in FIG. 8 employs a roller member which serves as an idle member 29. By means of a shaft 30, the idle member 29 is rotatably supported on the drive frame 11 and adapted for horizontal sliding movement in a slot 31 formed in the side wall of the drive frame 11. The drive dog 12 is positively biased by a spring 32, while the stop dog 16, instead of being spring-loaded, is urged toward a counter-transport direction for pivotal movement by means of an eccentric weight 33.

In the embodiment shown in FIG. 9, a slide bar adapted for horizontal sliding movement serves as an idle member 34. The barlike idle member 34 is slidably supported on a holder 35 fixed to the drive frame 11. The opposite ends 34*a* and 34*b* of the idle member 34 are in facing relation to the rear face of the drive dog 12 and to the front face of the stop dog 16 respectively. A spring 36 for the drive dog 12 and a spring 37 for the stop dog 16 bias the respective dogs toward the counter-transport direction.

In the embodiments illustrated in FIGS. 8 and 9, the transport assembly 10 is reciprocally driven by a drive belt 38 as in the embodiment previously described. During reciprocation, the idle members 29 and 34 are associated with the opposing faces of the drive dog 12 and the stop dog 16 so as to cause the dogs 12 and 16 to move in the same manner as in the foregoing embodiment and to thereby enable the transport assembly 10 to perform its function.

Figure 10:
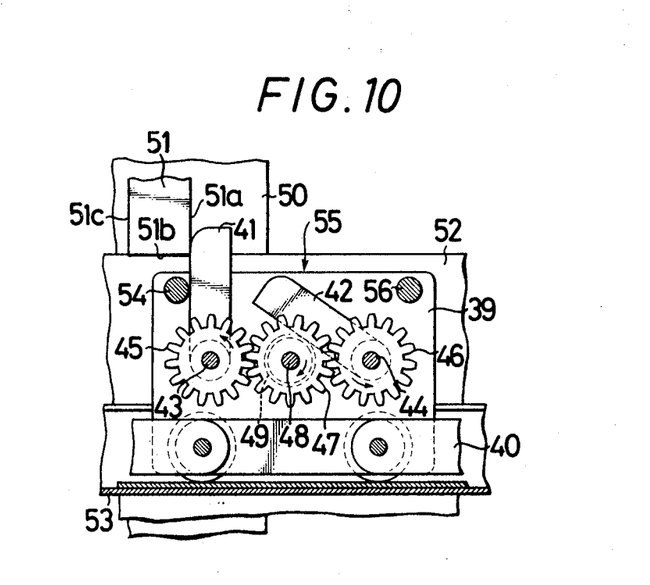
FIG. 10 is a side elevation in vertical section showing an embodiment in which the drive dog and the stop dog are interlocked with each other by gears.

FIG. 10 illustrates an embodiment including a transport assembly wherein the drive dog and stop dog are operatively related with each other by gears. Referring to FIG. 10, a drive frame 39 secured to a drive belt 40 provides a drive dog 41 and stop dog 42 which are mounted thereon by a pivot 43 and a pivot 44 respectively. The drive dog 41 carries a gear 45 on its pivot and the stop dog 42, a gear 46 on its pivot. An intermediate gear 47, disposed between the drive dog 41 and the stop dog 42, is mounted on a shaft 48 on the drive frame 39 and meshes with the gears 45 and 46. A spring 49 urges the gear 47 toward the transport direction. Indicated at 50 is a filter plate; at 51, a handle of the filter plate 50; at 52, a side bar of the filter press which supports the handle 51 in movable manner; and at 53, a guide rail for the drive belt 40.

The intermediate gear 47, being urged in the transport direction by the spring 49, acts to rotate the drive dog 41 and stop dog 42 in the counter-transport direction all the time. However, the drive dog 41, when positioned upright, is prevented from further pivotal movement in the counter-transport direction by a stopper 54 fixed to the drive frame 39. Thus, the intermediate gear 47 usually retains the drive dog 41 in upright position. On the other hand, the gear 46 on the stop dog 42 is meshed with the intermediate gear 47 in such manner that, when the drive dog 41 is in the upright position, the stop dog 42 remains inclined toward counter-transport direction. Accordingly, the transport assembly 55 is usually in the state shown in FIG. 10. The drive frame 39 further includes another stopper 56 which serves to prevent the stopper dog 42 in the upright position from further pivotal movement in the transport direction. The intermediate gear 47 is moved in such range that the drive dog 41 is moved from the upright position to such an extent that the stop dog 42 is brought to the upright position, the intermediate gear 47 acting to incline the stop dog 42 toward the counter-transport direction when raising the drive dog 41 and causing the stop dog 42 to stand up when inclining the drive dog 41 toward the transport direction.

The transport assembly 55 is moved back and forth by the drive belt 40 for the transport of the filter plates 50. During this operation, the drive dog 41 and the stop dog 42 function in the same manner as in the first embodiment already described. When the transport assembly 55 in the state as shown in FIG. 10 is moved in the counter-transport direction and the drive dog 41 is thereby brought into contact with rear face 51a of handle 51 of the filter plate 50 as seen in the figure, the drive dog 41 is forced to incline in the transport direction by the handle 51. The gear 45 on the drive dog 41 therefore rotates the intermediate gear 47 in the counter-transport direction against the action of the spring 49, with the result that the intermediate gear 47 brings the stop dog 42 to the upright position by way of the gear 46 in meshing engagement therewith. As the transport assembly 55 in this state is further advanced in the counter-transport direction, the inclined drive dog 41 passes along the under face 51b of the handle 51 until the dog 41 is released from the handle 51. At the same time, the upstanding stop dog 42 comes into contact with the rear face 51a of the handle 51, whereupon the running direction of the transport assembly 55 is switched from counter-transport direction to transport direction. When the transport assembly 55 is initiated into movement in transport direction, the stop dog 42 is freed from contact with the rear face 51a of the handle 51. In this state, the drive dog 41 and stop dog 42 are free to move and under the action of the intermediate gear 47 loaded with the spring 49, the drive dog 41 is raised and the stop dog 42 is inclined. Further movement of the transport member 55 in the transport direction causes the upright drive dog 41 to contact the front face 51c of the handle 51 and to thereafter push the handle 51 in the transport direction to send the plate 50 in the direction of the arrow a. Thus, the filter plate 50 finally reaches the terminal position of transport beside the movable end plate, whereupon the running direction of the drive belt 40 moving the drive assembly 55 is switched to the counter-transport direction. Since the transport assembly 55 at this time is in usual state wherein the drive dog 41 is in upright position with the stop dog 42 in inclined position, the stop dog 42 will not contact the handle 51 of the plate 50 which has been transported, during the travel of the transport assembly 55 in the counter-transport direction. Accordingly, upon change of the running direction of the drive belt 40, the transport assembly 55 which has finished transportation of the plate 50 can be sent toward the next plate 50 for a subsequent transport operation. By carrying out such operation repeatedly, the embodiment shown in FIG. 10 releases the filter plates which have been pressed together for filtration and moves them toward movable end plate one after another as carried out by the first embodiment.

The embodiment shown in FIGS. 11 to 14, provided with a drive dog and a stop dog similar to those in the aforementioned embodiments, includes engaging means for arresting the stop dog when it is in inclined position. The engaging means is operated by the drive dog and freed from engagement with the stop dog by the drive dog when the drive dog is inclined.

Referring to FIGS. 11 to 14, the transport assembly 58 secured to the drive belt 57 is provided with a drive dog 59 and a stop dog 60. The drive dog 59 is mounted on a drive frame 62 by a pivot 61 and biased in the counter-transport direction by a spring 63. The drive dog 59 is further provided with a projection 64 on its side which faces the stop dog 60. On the other hand, the stop dog 60 is pivotally mounted on the transport frame 62 by a pivot 65 and urged in the transport direction by a spring 66. The stop dog 60 is further provided with a pin 67 on its one face. An engaging member 68 interposed between the drive dog 59 and the stop dog 60 is supported, at its middle portion, on a pivot 73 fixed to the drive frame 62. The engaging member 68 has a hook 68a adapted for engagement with the pin 67 on the stop dog 60 and a tail end 68b adapted for engagement with a projection 64 on the drive dog 59. When the hook 68a of the engaging member 68 is in engagement with the pin 67, the stop dog 60 is inclined toward the counter-transport direction. Since the engaging member 68 is biased by a spring 69 in the clockwise direction, the tail end 68b is always held in contact with the projection 64 of the drive dog 59. Indicated at 70 is a filter plate; at 71, a handle of the filter plate 70; at 72, a side bar for supporting the handle 71 in movable manner; at 73, a stopper for the drive dog 59; and at 74, a stopper for the stop dog 60.

Figure 11:
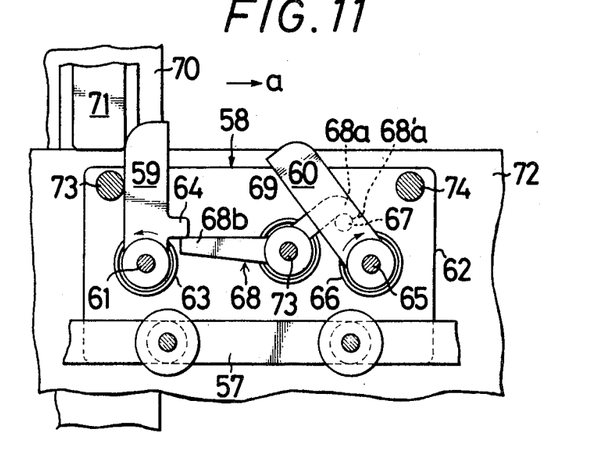
FIGS. 11 and 12 are side elevations in vertical section showing the operation of the drive dog and the stop dog which are interlocked with each other in another mode.
Figure 12:
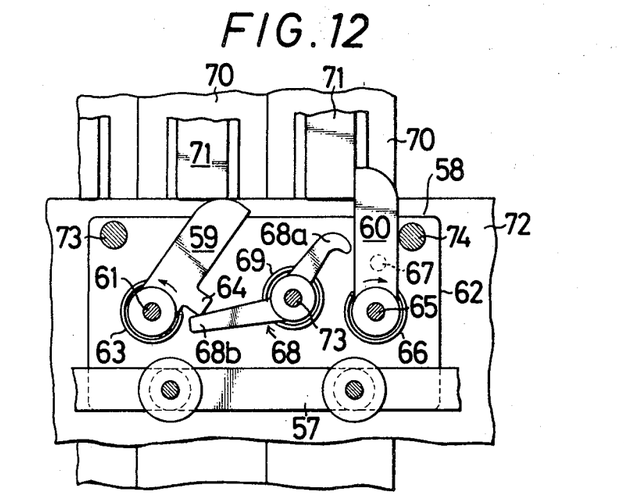
Figure 13:
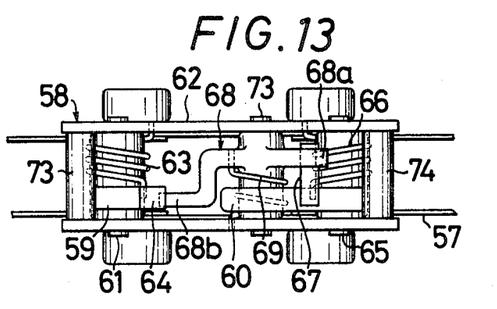
FIG. 13 is a plan view of FIG. 12.
Figure 14:
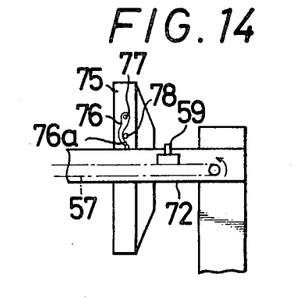
FIG. 14 is a side elevation showing a principal part of a filter press provided with the transport assembly of the type shown in FIGS. 11 and 12.

The transport assembly 58 is carried on the drive belt 57 for reciprocation and releases and transports the filter plates 70, in pressing contact with each other for filtration, in the direction of the arrow a. As illustrated in FIG. 11, when the transport assembly 58 is in usual state, the drive dog 59 is retained in an upright position by the stopper 73 against further pivotal movement and the stop dog 60 is kept inclined toward the counter-transport direction. Further in this state, the engaging member 68 retains the stop dog 60 in the inclined position with the hook 68a in engagement with the pin 67. The transport assembly 58 located in a usual position is first driven in the counter-transport direction by the drive belt 57 in order to transport the rearmost filter plate 70 of a group of plates 70 in fitting engagement. When the transport assembly 58 advances toward the group of the plates, the drive dog 59 comes into contact with the rear face 71a of the handle 71 of the filter plate 70, whereupon the drive dog 59 is forced to incline against the action of the spring 63 acting thereon and thereafter passes along the under face 71b of the handle 71. When the transport assembly 58 is further moved in the counter-transport direction, the drive dog 59 is freed from engagement with the under face 71b of the handle 71 and is ready to stand up under the action of the spring 63. On the other hand, when the drive dog 59 is inclined upon contact with the handle 71, the projection on the drive dog 59 depresses the tail end 68b of the engaging member 68 in engagement therewith, whereby the engaging member 68 is rotated in the counterclockwise direction against the spring 69 acting thereon allowing the hook 68a to be disengaged from the pin 67 on the stop dog 60. As a result, the stop dog 60, now set free, is pivotally moved in the transport direction under the action of the spring 66 acting thereon, until it is blocked by the stopper 74, by which the stop dog 60 is retained in an upright position. The stop dog 60 in the upright position comes into contact with the rear face 71a on the handle 71 when or after the drive dog 59 is released from the under face 71b of the handle 71. Upon contact of the stop dog 60 with the rear face 71a of the handle 71, the running direction of the drive belt 57 is switched from counter-transport direction to transport direction. When the transport assembly 58 is initiated into travel in the transport direction, the stop dog 60 is freed from contact with the rear face 71a of the handle 71. If the drive dog 59 is slightly inclined due to contact with the handle 71 of the next plate 70, the travel of the transport assembly 58 thus initiated brings the drive dog 59 to upright position between the handles 71 of the rearmost plate and the next plate. When thus brought to the upright position, or while retaining the upright position if the arrangement is such that the drive dog 59 is not inclined by the next plate 70, the drive dog 59 comes into contact with the front face 71c of the handle 71 of the rearmost position. Due to the subsequent travel of the transport assembly 58 in the transport direction, the drive dog 59 carries the rearmost filter plate 70 in the direction of the arrow a in engagement with its handle 71. Prior to the transport of the filter plate 70, the upstanding drive dog 59 frees the tail end 68b of the engaging member 68 from depression by its projection 64 to return the engaging member to usual position. Accordingly, the engaging member 68 is so positioned that the hook 68a is ready for engagement with the pin 67 of the stop dog 60. After the transport assembly has sent the rearmost plate 70 to the terminal position of transport beside the movable end plate 75, the running direction of the drive belt 57 will be switched to the counter-transport direction and the transport assembly will then be moved in this direction for the transport of the next plate. However, the stop dog 60, if it remains upright at this time, cannot pass under the rearmost plate 70 which has been transported. In order to eliminate such trouble, the present embodiment includes an auxiliary member 76 which is provided on one side of the movable end plate 75. The upper end of this member 76 is pivotally supported at 77 and the free end 76a thereof is positioned in the path of travel of the stop dog 60. The auxiliary member 76 is free to move pivotally in the counter-transport direction but is prevented from moving in the transport direction by a stopper 78. When the transport assembly 58 has completed transport of the rearmost plate 70, the stop dog 60 is therefore inclined in the counter-transport direction by the auxiliary member 76 upon contact therewith, whereupon the pin 67 pushes the outer peripheral portion 68'a of the engaging member 68 to pivotally move the engaging member 68 slightly in the counterclockwise direction and, while moving inwardly of the hook 68a along its outer periphery 68'a, the pin 67 engages the hook 68a under the action of the spring 69 on the engaging member 68. Thus, prior to the travel of the transport assembly 58 in the counter-transport direction, the stop dog 60 is arrested by the engaging member 68 while being retained in inclined position in the counter-transport direction as shown in FIG. 11. When the transport assembly 58 is moved in the counter-transport direction, the stop dog 60 can be kept free from interference with the plate 70 which has been transported. When the transport assembly 58 has completely transported the next plate 70, the stop dog 60 is inclined by the handle 71 of the preceding filter plate 70 and the transport assembly is therefore returned to the state shown in FIG. 11 before it is initiated into travel in the counter-transport direction. While travelling back and forth, the transport assembly 58 carries the filter plates 70 toward the movable end plate 75 one after another every time it moves in the transport direction. After completion of transport of all the filter plates 70, the drive belt 57 is drive in the transport direction as in the first embodiment to position the transport assembly 58, for instance, in the rear of the movable end plate 75 as shown in FIG. 14. After the next filtration, the transport assembly 58 will be moved in the counter-transport direction from the position shown in FIG. 14 in order to transport the rearmost plate. Since the auxiliary member 76 mounted on the movable end plate 75 can be moved pivotally in the counter-transport direction, the drive dog 59, even when abutting against the auxiliary member 76, is not thereby inclined but kicks it up to move forward while retaining the usual position as shown in FIG. 11. The auxiliary member 76 kicked up will be brought back to the original position due to gravity upon passage of the drive dog 59. This resoring action may alternatively be effected by spring, in which case the spring must of course be sufficiently weaker than the spring 63 acting on the drive dog 58.

Figure 15:
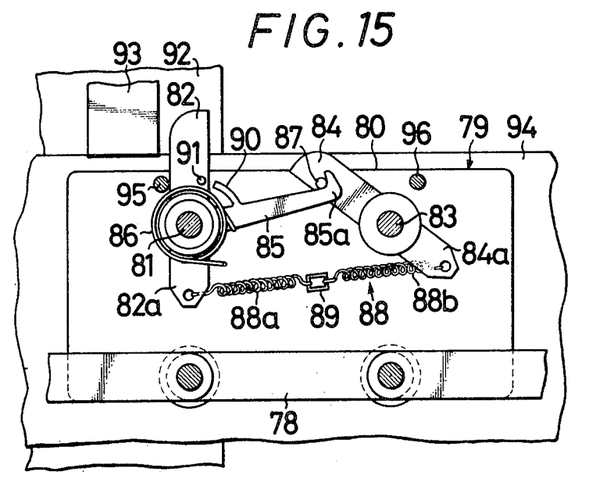
FIGS. 15 and 16 are side elevation in vertical section showing the operation of the drive dog and the stop dog which are interlocked with each other in another mode.
Figure 16:
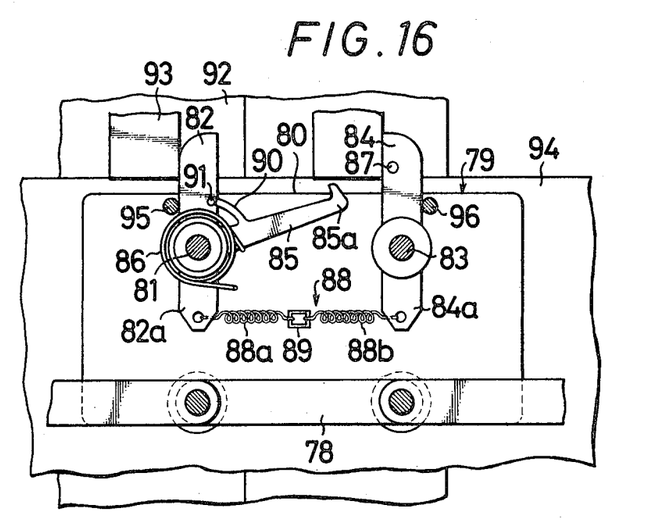
Figure 17:
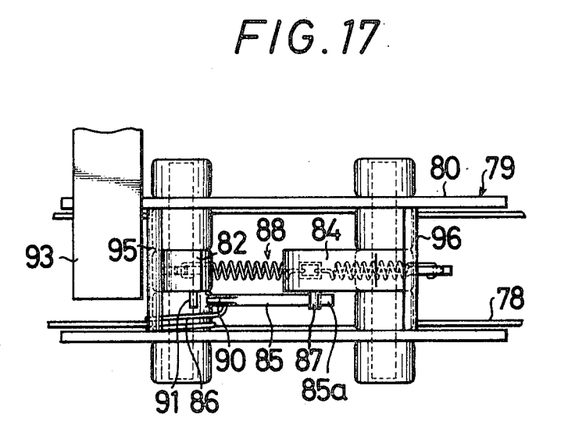
FIG. 17 is a plan view of FIG. 15.

The embodiment shown in FIGS. 15 to 17 includes another transport assembly provided with a drive dog and a stop dog which function in a similar manner to those shown in FIG. 14. An engaging member for holding the stop dog in an inclined position is pivotally mounted together with the drive dog, and springs for raising the drive dog and the stop dog are provided between the drive dog and the stop dog.

Referring to FIGS. 15 to 17, a transport assembly 79 secured to the drive belt 78 includes a drive dog 82 pivotally mounted on a drive frame 80 at 81 and a stop dog 84 pivotally mounted thereon by a pivot 83. The pivot 81 also supports the base end of an engaging member 85 having a hook 85a at its distal end. The engaging member 85 is biased in the counter-clockwise direction by a spring 86 so that the hook 85a engages a pin 87 on the stop dog 84 when the dog 84 is inclined in the counter-transport direction. A spring 88 is provided between the downwardly projecting end 82a of the drive dog 82 and the downwardly projecting end 84a of the stop dog 84. The spring 88 pivotally urges the drive dog 82 in the counter-transport direction while urging the stop dog 84 in the transport direction. The spring 88 comprises a raising spring 88a for the drive dog 82 and an actuating spring 88b for the stop dog 84 with a link 89 disposed therebetween for connecting the springs. Accordingly, irrespective of whether the spring 88 comprises one spring or two springs, the spring performs the actions described above. The drive dog 82 is further provided with a stopper pin 91 for a projection 90 on the engaging member 85 which pin acts to limit the pivotal movement of the engaging member 85 when it is set free and to associate with the projection 90 to move the engaging member 85 clockwise when the drive dog 82 is inclined. The spring 88 may of course be provided in some other manner. Indicated at 92 is a filter plate; at 93, a handle of the plate 92; at 94, a side bar for movably supporting the filter plate 92 by the handle 93. Since the drive dog and stop dog function in the same manner as those in the embodiment shown in FIGS. 11 to 14, a series of operations of the dogs will be omitted.

Figure 18:
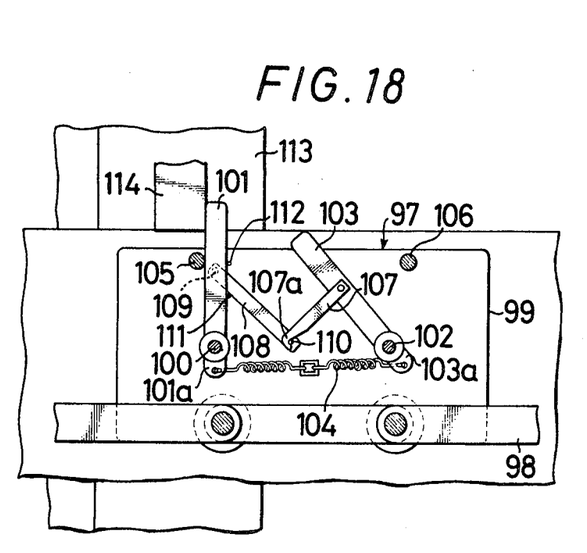
FIG. 18 is a side elevation in vertical section showing another mode of interlocking the drive dog with the stop dog.

The embodiments shown in FIG. 18 includes an engaging member mounted on the stop dog on the transport assembly, the arrangement being such that, through the engagement of a hook of the engaging member with a pin on the drive dog, the stop dog remains inclined in the counter-transport direction.

Referring to FIG. 18, a transport assembly 97 is secured to a drive belt 98 and includes a drive dog 101 pivotally mounted on a drive frame 99 at 100 and a stop dog 103 also pivotally mounted thereon at 102. A spring 104 is provided between a downwardly extending portion 101a of the drive dog 101 and a downwardly extending portion 103a of the stop dog 103, the spring 104 serving to urge the drive dog 101 in the counter-transport direction and the stop dog 103 in the transport direction respectively. A stopper 105 for the drive dog 101 limits the pivotal movement in the counter-transport direction of the drive dog 101 so as to retain the drive dog 101 in an upright position when it is set free. A stopper 106 for the stop dog 103 limits the pivotal movement of the stop dog 103 in the transport direction in order to retain the stop dog 103 in an upright position when it is set free. The stop dog 103 is provided with an armlike engaging member 107 extending toward the drive dog 101. The drive dog 101 carries a lever 108 one end of which is pivoted thereon at 109. The lever 108 is implanted, at its free end, with a pin 110 for engagement with a hook 107a at the distal end of the engaging member 107, the arrangement being such that when the hook 107a is in engagement with the pin 110, the stop dog 103 is retained in an inclined position in the counter-transport direction. Due to gravity, the lever 108 tends to pivotally move clockwise all the time, but this movement is limited by a stopper 111 mounted on the drive dog 101, so that the lever 108 is retained in a position suitable for engagement with the hook 107a. The drive dog 101 is further provided with another stopper 112 which limits the pivotal movement of the lever 108 in the counter-clockwise direction but which is so arranged as to permit the lever 108 to move to some extent. When the transport assembly 97 has completely transported the filter plate 113 to the position beside the movable end plate and the stop dog 103 comes into contact with an auxiliary number as shown in FIG. 14 or with the handle 114 of a preceding plate 113 and is thereby inclined in the counter-transportation direction, the hook 107a of the engaging member 107 comes to a position for engagement with a pin 110 on the lever 108 on the drive dog 101. When the stop dog 103 is thus inclined in the counter-transportation direction, the pin 110 contacts the outer peripheral portion of the hook 107a whereupon it is slightly retracted within the range of pivotal movement allowed for the lever 108, with the result that the hook 107 moves beyond the pin 110 to a position for proper engagement. Upon reaching this position, the hook 107a engages the pin 110 and retains the stop dog 103 in the inclined position. After the transport assembly 97 has further advanced in the counter-transport direction for the transport of the plates pressed together, thereby bringing the drive dog 101 into contact with the handle 114 of the rearmost plate 113, the subsequent travel of the transport assembly 97 in the counter-transport direction causes the drive dog 101 to incline in the transport direction upon contact with the handle 114. When thus inclined, the drive dog 101 permits the pin 110 on the lever 108 to get disengaged from the hook 107a on the engaging member 107. Accordingly, the stop dog 103 is freed before the drive dog 101 is released from the handle 114 and brought to the upright position under the action of the spring 104.

Performing the above described operation, the drive dog 101 and stop dog 103 transport the plates as seen in the embodiments already described.

Figure 19:
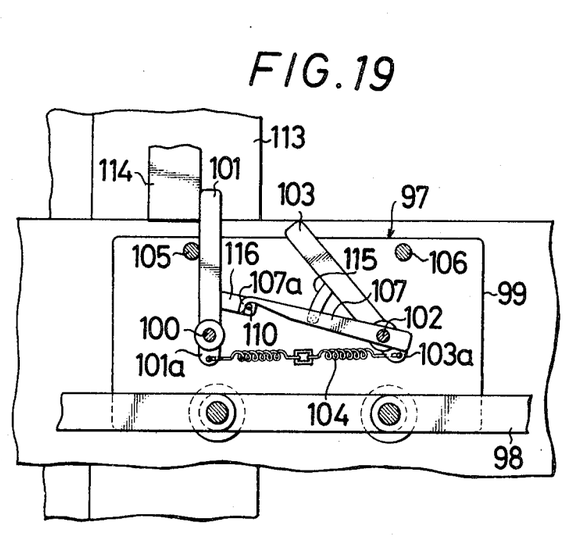
FIG. 19 is a side elevation in vertical section showing still another mode of interlocking the drive dog with the stop dog.

The engaging member 107 provided on the stop dog 103 may alternatively be mounted, as shown in FIG. 19, on the drive frame 99 coaxially with the stop dog 103 by pivot 102, with an arm 115 connecting the engaging member 107 to the stop dog 103, so as to be pivotally moved integrally with the stop dog 103. Further in the embodiment of FIG. 19, the pin 110 for engagement with the hook 107a of the engaging member 107 is mounted on an arm 116 fixed to the drive dog 101. Thus, when the stop dog 103 is inclined to engage the hook 107a with the pin 110, the hook 107a moves over the pin 110 while causing the drive dog 101 to incline slightly, whereby engagement of the hook 107a with the pin 110 is insured.

I claim:

1. A mechanism for automatically transporting filter plates, in a filter press having a fixed end plate and a movable end plate, in a transport direction when opening said press and for automatically counter-transporting said filter plates in a counter-transport direction when closing said filter press, comprising:
   A. a drive belt, mounted on said filter press transversely to said filter plates, which is driven by a motor having a reciprocal switch means; and
   B. a transport assembly, comprising:
      1. a drive frame which is selectively fastened to said drive belt,
      2. a drive dog, for said transporting, which extends upwardly from a pivotal mount on said drive frame and pivots in said transport direction toward an inclined position,
      3. a stop dog, for said counter-transporting, which:
         a. extends upwardly from a pivotal mount on said drive frame,
         b. pivots in said counter-transport direction toward an inclined position, and
         c. is spaced from said drive dog in said transport direction by a distance greater than the thickness of one of said filter plates,
      4. a transport stopper, disposed in said counter-transport direction from the pivotal mounting of said drive dog so that said drive dog is disposed uprightly when thereagainst,
      5. a spring means which urges said drive dog pivotally against said transport stopper,
      6. a counter-transport stopper, disposed in said counter-transport direction from the pivotal mounting of said stop dog so that said stop dog is disposed uprightly when thereagainst,
      7. a biasing means which urges said stop dog pivotally away from said counter-transport stopper and toward said inclined position thereof, and
      8. an idle member which is disposed between said drive dog and said stop dog for forcing said stop dog toward and against said counter-transport stopper when said drive dog is forced into said inclined position thereof, said drive dog and said stop dog each being provided with such length and path of movement that said dogs contact the projecting handles of said filter plates when uprightly disposed but pass pivotally beneath said handles, and said dogs being spaced apart sufficiently that either of said dogs has space for pivotal movement when the other of said dogs is uprightly disposed and in contact with one of said handles.

2. The mechanism of claim 1 wherein, after a filtration has been completed, the following steps occur automatically and sequentially during operation of said filter press until all of said filter plates have been transported and the cake therebetween has dropped therefrom:
   A. while said drive belt is moving in said counter-transport direction, said drive dog passes pivotally beneath the handle of one of said filter plates and pushes said idle member toward said stop dog so that said stop dog is forced uprightly;
   B. said drive belt continues to move in said counter-transport direction until said stop dog is brought forcibly against said handle, whereupon said reciprocal switch means is activated;
   C. said drive belt moves in said transport direction, brings said drive dog into forcible contact with said handle, and transports said filter plate in said transport direction while said stop dog pivots toward said drive dog, thereby pivoting said idle member;
   D. said drive belt transports said filter plate into contact with said movable end plate, whereupon said reciprocal switch means is activated; and
   E. said drive belt moves in said counter-transport direction, while said stop dog passes beneath said handle, toward the next filter plate to be transported in sequence.

3. The mechanism of claim 1 wherein said idle member is pivotally mounted on said drive frame.

4. The mechanism of claim 1 wherein said idle member is mounted on a member which is adapted for reciprocal movement.

5. The mechanism for automatically transporting filter plates in a filter press as set forth in claim 1 wherein said idle member is adapted for sliding movement.

6. The mechanism for automatically transporting filter plates in a filter press as set forth in claim 1 wherein each of said drive dog and said stop dog is provided with a gear mounted on its pivot, said gears being in meshing engagement with a common gear so as to interlock said dogs with each other.

7. The mechanism for automatically transporting filter plates in a filter press as set forth in claim 1 wherein said transport assembly is provided with an engaging member for holding said stop dog in an inclined position, said engaging member being operated by a drive dog so as to free said stop dog from the holding engagement when said drive dog is inclined.

8. The mechanism for automatically transporting filter plates in a filter press as set forth in claim 7 wherein said engaging member for said stop dog is pivotally mounted between said drive dog and said stop dog, said engaging member being provided with a hook at one end for holding said stop dog and a tail portion at the other end to be operated by said drive dog.

9. The mechanism for automatically transporting filter plates in a filter press as set forth in claim 7 wherein said engaging member for holding said stop dog is pivotally mounted coaxially with said drive dog.

10. The mechanism for automatically transporting filter plates in a filter press as set forth in claim 7 wherein said engaging member for holding said stop dog is provided with a hook secured to said stop dog and a pin for engagement with said hook is formed on a lever mounted on said drive dog.

11. The mechanism for automatically transporting filter plates in a filter press as set forth in claim 7 wherein a hook of said engaging member for holding said stop dog is pivotally mounted coaxially with said stop dog and formed as a member to be pivotally moved integrally with said stop dog, a pin for engagement with said hook being mounted on an arm secured to said drive dog.

* * * * *